US011019956B2

(12) United States Patent
Gross et al.

(10) Patent No.: US 11,019,956 B2
(45) Date of Patent: Jun. 1, 2021

(54) DIGITAL SCALE AND BREWING PROCESS THEREFROM

(71) Applicant: Eternal East (HK) Ltd., Hong Kong (CN)

(72) Inventors: Charles Brian Gross, Cheyenne, WY (US); Nile Robert Fedewa, Ft. Collins, CO (US)

(73) Assignee: ETERNAL EAST (HK) LTD., Hong Kong (CN)

( * ) Notice: Subject to any disclaimer, the term of this patent is extended or adjusted under 35 U.S.C. 154(b) by 360 days.

(21) Appl. No.: 15/877,229

(22) Filed: Jan. 22, 2018

(65) Prior Publication Data
US 2018/0220833 A1    Aug. 9, 2018

Related U.S. Application Data

(60) Provisional application No. 62/455,088, filed on Feb. 6, 2017.

(51) Int. Cl.
*A47J 31/40* (2006.01)
*A47J 31/44* (2006.01)
(Continued)

(52) U.S. Cl.
CPC .......... *A47J 31/402* (2013.01); *A47J 31/002* (2013.01); *A47J 31/401* (2013.01); *A47J 31/404* (2013.01);
(Continued)

(58) Field of Classification Search
CPC ........ A47J 31/402; A47J 31/40; A47J 31/404; A47J 31/401; A47J 31/44; A47J 31/002;
(Continued)

(56) References Cited

U.S. PATENT DOCUMENTS 7,780,081 B1 * 8/2010 Liang ................. G06Q 30/0633
235/383
8,615,364 B1 * 12/2013 Selman ................... E21B 44/00
702/9

(Continued)

FOREIGN PATENT DOCUMENTS

CN    103619222 A    3/2014
CN    105308421 A    2/2016
(Continued)

OTHER PUBLICATIONS

CN 107595136; Li Tianhe; Intelligent Coffee Scale; Aug. 10, 2020; pp. 1-5 (Year: 2020).*
(Continued)

*Primary Examiner* — Bayan Salone
(74) *Attorney, Agent, or Firm* — Polson Intellectual Property Law, PC; Margaret Polson; Christopher Sylvain

(57) ABSTRACT

A digital scale for optimizing coffee brewing, and pour-over brewing in particular, is provided. Specifically, the present disclosure relates to a scale configured to determine the target amount of water to add based on any amount of coffee grounds used, compare an actual pour rate to a target pour rate when adding the target amount of water over a specific target pour time, and clearly communicate the same to the user.

20 Claims, 8 Drawing Sheets

(51) Int. Cl.
*A47J 31/00* (2006.01)
*G01G 19/00* (2006.01)
*G01G 19/34* (2006.01)
*G01G 19/56* (2006.01)
*G05D 27/02* (2006.01)

(52) U.S. Cl.
CPC .............. *A47J 31/44* (2013.01); *G01G 19/00* (2013.01); *G01G 19/34* (2013.01); *G01G 19/56* (2013.01)

(58) Field of Classification Search
CPC ........ G05D 27/02; G01G 19/00; G01G 19/56; G01G 19/24; G01G 19/52
See application file for complete search history.

(56) References Cited

U.S. PATENT DOCUMENTS 8,829,365 B1    9/2014    Wallace et al.
2014/0137746 A1*    5/2014    Moran .................... G01G 19/56
                                                                99/280
2014/0332289 A1    11/2014    Gallagher, Jr.
2016/0220060 A1*    8/2016    Clark ......................... A23L 2/60

FOREIGN PATENT DOCUMENTS

| CN | 206659679 U | 11/2017 | |
| CN | 206818304 U | 12/2017 | |
| CN | 107595136 * | 1/2018 | .............. A47J 31/44 |
| JP | S56-13922 A | 2/1981 | |
| WO | 2014021710 A2 | 2/2014 | |
| WO | 2018001499 A1 | 1/2018 | |

OTHER PUBLICATIONS

Extended European Search Report dated Oct. 15, 2018 in related European application 18155400.7.
Office Action dated May 28, 2019 in related Chinese application No. 201810114175.3.

* cited by examiner

DIGITAL SCALE AND BREWING PROCESS THEREFROM

BACKGROUND

The present disclosure relates generally to the use of digital scales in the preparation coffee. The Specialty Coffee Association of America (SCAA) and the Specialty Coffee Association of Europe (SCAE)—which merged to form the Specialty Coffee Association (SCA)—recommend a preferred water to coffee grounds weight ratio of 17:1. Similarly, certain industry standards have also recommended an optimal pour over time for the water over the coffee grounds of about 2.5 minutes (150 seconds). Although digital scales have been previously used in the coffee brewing process, such as by measuring out a precise weight of coffee grounds for a specific serving size, such scales have not been used to optimize and control the water-to-grounds ratio and/or pour over rate.

The foregoing examples of the related art and limitations therewith are intended to be illustrative and not exclusive. Other limitations of the related art will become apparent to those of skill in the art upon a reading of the specification and a study of the drawings.

SUMMARY

The present disclosure relates generally to a digital scale and brewing process for making coffee and other brewed beverages, and a pour-over brewing process in particular. One aspect of the present disclosure is to provide a scale that is configured to readily communicate a target amount of water to add based on a selected weight ratio of water to coffee grounds (or tea leaves, botanical/herbal blends, etc.), regardless of the amount of grounds added by a user. Another aspect of the present disclosure is to provide a scale configured to compare an actual rate of pour to a target rate of pour. A further aspect of the present disclosure is to provide a scale configured for a simple pour-over process that produces coffee brewed at optimal specifications. A further aspect of the present disclosure is to provide a scale that, by iterative implementation of a preferred brewing process, trains the user to recognize different ratios and achieve optimal pouring rates. Therefore, users may be able to transfer skillsets first learned using the scale to other brewing circumstances and settings (e.g., artisan baristas using pour-over techniques). A further aspect of the present disclosure is to provide clear visual and/or audio indication to communicate to users when the target ratio has been reached, compare an actual pour rate to the target pour rate over a target pour time, signal when to start and stop adding water for pre-infusion and cyclic pouring techniques, and otherwise assist in the brewing process. A further aspect of the present disclosure is to allow complete user customization of the brewing process using such a scale, including variable ratios, pour rates, and pour times.

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

In some embodiments, the user may add any amount of coffee grounds to a zeroed brewing vessel positioned on the scale. Once the desired amount of grounds has been added, the user simply hits a button to automatically determine the precise amount of water to add to the vessel by using a default or selected weight ratio (e.g., 17:1). The user may then add water until the target amount of water is reached, as measured and indicated in real time by the scale. In certain embodiments, a pour rate mode may be initiated with the add water step. In the pour rate mode, a target pour rate (based off a default or selected target pour time) and an actual pour rate (based off the proportional weight of water added relative to the target amount) are visually represented on the display, thereby allowing a user to compare and attempt to match the actual pour rate with the target pour rate by making any necessary adjustments to his or her pouring. In this way, a user may achieve or substantially achieve a constant pour rate through a desired pour-over time (e.g., 150 seconds). In other embodiments where a variable pour rate is desirable, audio and/or visual display indicators may communicate to users when to add water and pause the pouring over the total target pour time, such as with a pre-infusion process and cyclic stop-and-go pouring methods.

In addition to the aspects and embodiments described above, further aspects and embodiments will become apparent by reference to the accompanying drawings and the detailed description forming a part of this specification.

BRIEF DESCRIPTION OF THE DRAWINGS

The present disclosure is described in greater detail below with reference to the following figures.

Before further explaining the depicted embodiments, it is to be understood that the invention is not limited in its application to the details of the particular arrangements shown, since the invention is capable of other embodiments. It is intended that the embodiments and figures disclosed herein are to be considered illustrative rather than limiting. Also, the terminology used herein is for the purposes of description and not limitation.

DETAILED DESCRIPTION

Figure 1:
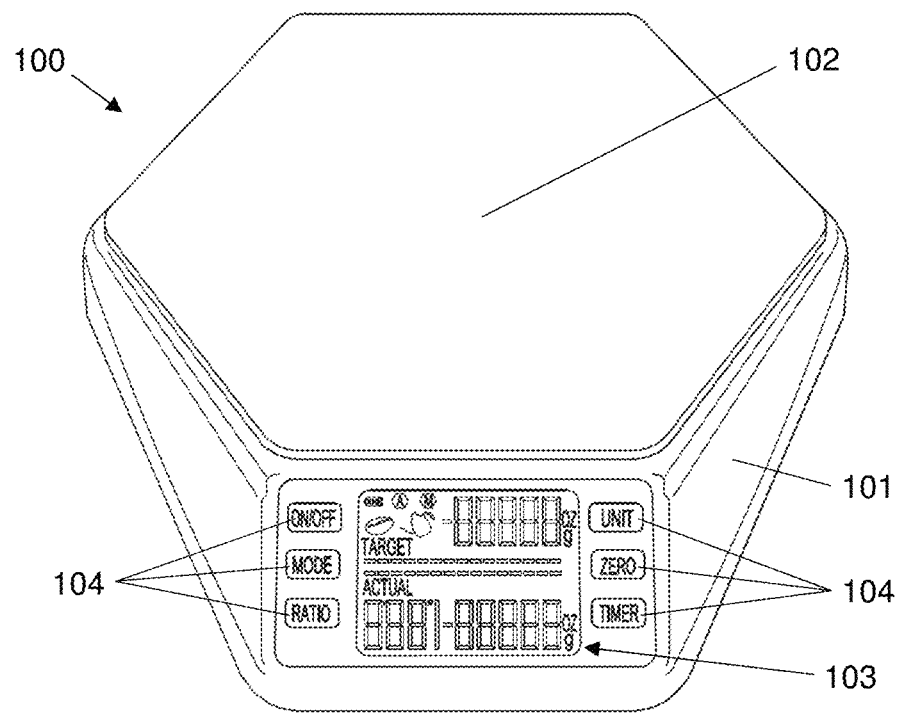
FIG. 1 shows an embodiment of a scale according to the present disclosure.

FIG. 1 shows one possible embodiment of a digital scale 100 according to the present disclosure. Scale 100 comprises a base 101 to provide structural support and house scale components, a platform 102 for placing items to be weighed, a display 103 (e.g. LCD) to transmit information from the scale to a user, and input buttons 104 to transmit control signals from the user to the scale. For example, buttons 104 may correspond to on/off, mode, ratio, unit, zero/tare, and timer functions, among others. In some embodiments, scale 100 may be wireless and run on a rechargeable battery, wherein the display 103 may be configured to show the battery charge. In other embodiments, scale 100 may be constantly plugged into a power outlet. The scale may have a microcontroller or other suitable processor which executes the operating logic of the brewing process according to the present disclosure. The structural, electrical and electronic configurations of such a digital scale are known to those of skill in the art, and therefore not discussed in further detail herein.

Figure 2:
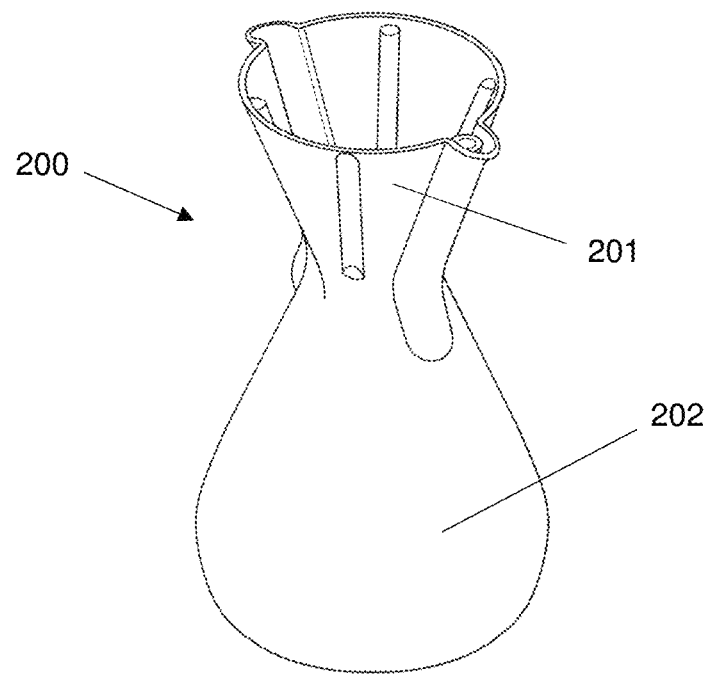
FIG. 2 shows a brewing vessel.

For illustrative purposes only, FIG. 2 shows a typical pour-over brewing vessel 200. Coffee grounds, tea leaves, botanical/herbal blends and the like are placed in a filter basket portion 201 of the vessel 200. Filter paper is usually first positioned in the filter basket portion 201 to hold the grounds, leaves, blends, etc. for straining. Then typically hot water is poured over the coffee grounds, for example, and the resulting brewed beverage is collected in the vessel body 202. Although the present disclosure is described in terms of brewing coffee, other beverages may also be produced within the scope and spirit of the present disclosure.

Figure 3:
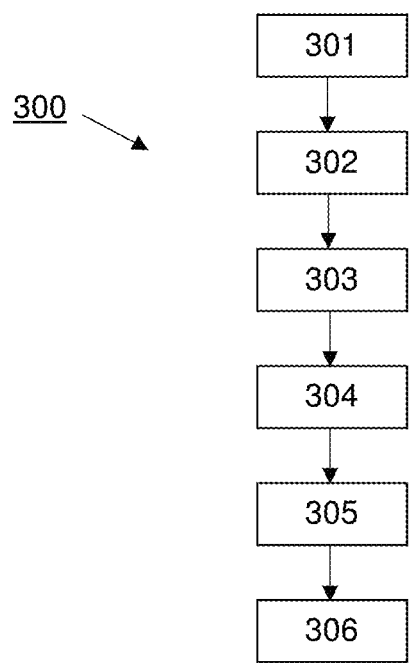
FIG. 3 shows a flowchart for a brewing process using a scale according to the present disclosure.
Figure 4:
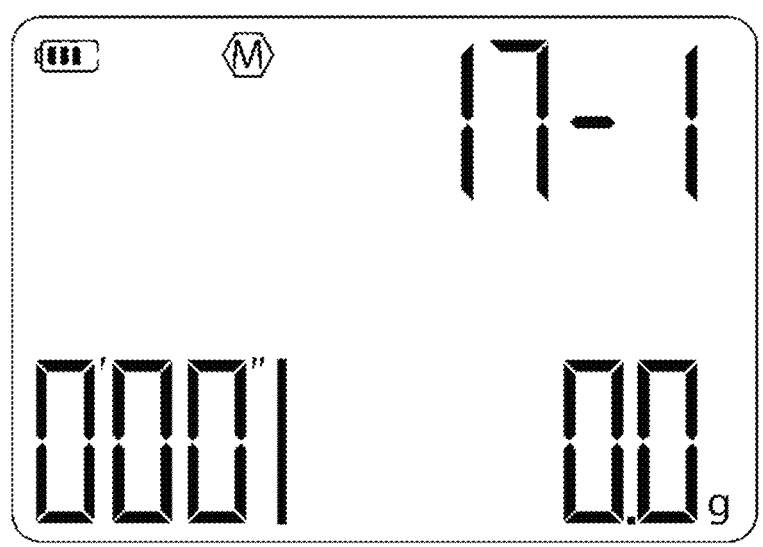
FIGS. 4-14 show possible embodiments of a scale display at various points in the brewing process of FIG. 3.

FIG. 3 shows a flowchart for a brewing process 300 according to the present disclosure. In a first step 301, the user turns the scale 100 on. At this point, the display 103 may be configured to indicate the currently selected brewing mode (e.g., manual or automatic) and/or the water to coffee grounds ratio (see FIG. 4) to the user for an initial interval of time, such as three seconds, for instance. It should be appreciated that the scale 100 may be also operated using a separate device (e.g., a smartphone, tablet computer, or the like). In these embodiments, the user inputs control signals into the device (not shown) using an application program, which then communicates with the scale 100 via a wired or wireless connection (e.g., Bluetooth technology, Wi-Fi, etc.). In this way, the display 103 can be provided on the scale 100, the device, or both. Although the following description is generally in terms of user input through a display on the scale, it applies equally to embodiments where primary user interaction is with a display of the separate device.

Figure 5:
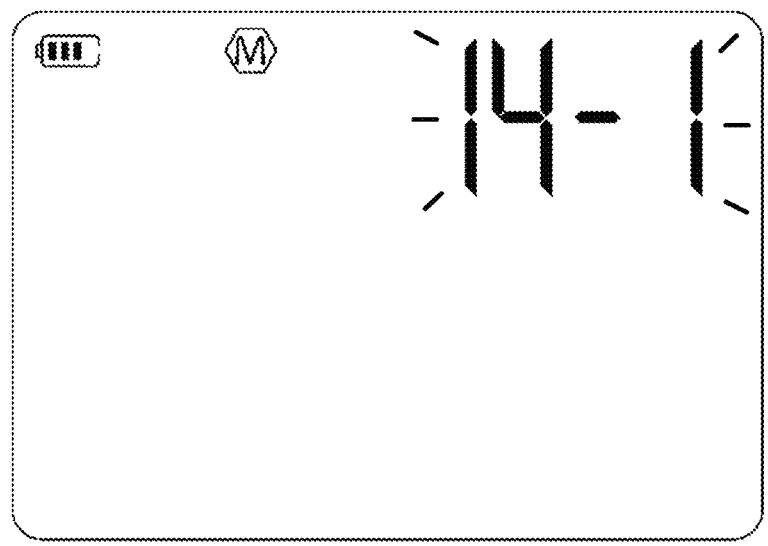

The starting mode may be determined by a preset default setting or by a saved setting, such as the last mode that was used. Likewise, the starting ratio may be determined by a preset default water to grounds ratio, for instance 17:1, or by a saved setting like the last ratio that was used. The user may also manually save a preferred mode and/or ratio setting to use when the scale 100 is powered on. After the scale 100 is turned on, the user can then select the desired mode and water/grounds ratio for that particular brew. For example, the user could briefly hit the mode button to alternate between mode settings and hold down the mode button to switch the ratio setting. In some embodiments, the ratio may be selected from a group of preset ratios such as 14:1 through 20:1 (see FIG. 5). In other embodiments, the user may manually input any desired water/grounds ratio to use. The scale 100 may further be configured for additional brewing modes that are not coffee based, such as for tea or botanical/herbal blends. Like with coffee-specific modes, the user may select between a default preset ratio setting, a previously saved ratio setting, or simply input a custom ratio setting. For instance, an 80:1 water to leaf weight ratio is recommended for certain teas, but if desirable, users can change preset ratio values according to taste, such as to 40:1. While the drawings generally show a brewing process 300 for coffee, it should be appreciated that any visual indications of the display 103 may be appropriately adjusted depending on the selected mode (e.g., coffee bean icons change to tea leave icons). The type of measurement unit displayed can also be changed, for example between grams or ounces, among others.

In embodiments incorporating a target pour time and/or target pour rate into the brewing process 300, as described below in step 305 (see FIGS. 12-16), the user may also input custom settings or use default/saved settings for the pour time and rate. For example, the user may adjust the target pour time, which may be advantageous between light/dark roasts and with different types of teas, or vary the pour rate over the target pour time. In pre-infusion of coffee grounds, an amount of water about twice that of the grounds is added to soak the grounds for a period of time (typically between 20-60 seconds) before the rest of the water is poured over. This process facilitates the release of carbon dioxide from the beans and extraction in the subsequent water wash. Likewise, in certain pour techniques, the user adds water and then pauses for a period of time before continuing to pour in a cyclic manner. This technique can create different flavor profiles compared to a constant pour rate technique, which may be desirable depending on the user's personal tastes or for different types of coffee. Therefore, the target pour rate may reflect such a pre-infusion process or cyclic pour technique at the user's option, providing an array of options for brewing to a user's preference according to the present disclosure.

Once the settings are to the user's preference, the next step of the brewing process is initiated. Of course, it should be appreciated that preliminary adjustment of the settings is not strictly necessary for the brewing process, as the user may simply use whatever default settings are initially selected upon turning on the scale 100 and proceed directly to the following step.

Figure 6:
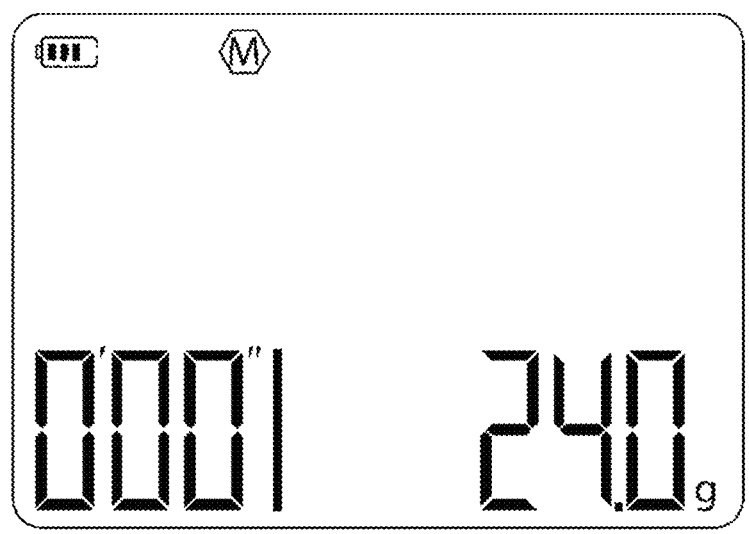
Figure 7:
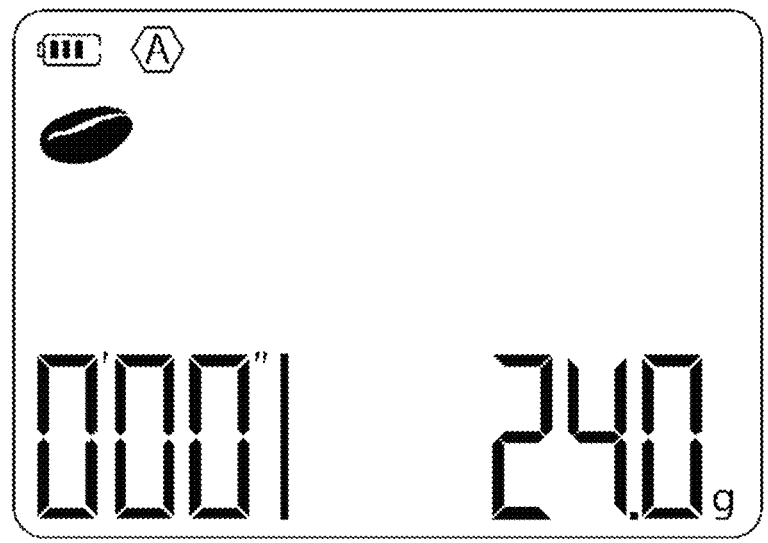

In a second step 302, the user places a brewing vessel on the scale platform 102. In manual mode, the user may then hit the zero button to tare the vessel. In automatic mode, the scale may automatically tare the vessel without further user input. The user then adds coffee grounds (or tea leaves, herbal/botanical blends, etc.) in a third step 303, for instance to the filter basket portion 201 of brewing vessel 200. The display 103 communicates the amount of coffee grounds by weight that has been added to the scale by the user (see FIG. 6). The weight that has been added is displayed in the lower right corner of the display 103 in the depicted embodiment, but alternatively may be shown in other locations on the screen. The user may add any amount of coffee grounds as he/she so desires according to the present disclosure. In some embodiments of the third step 303, the scale display 103 may show an icon (e.g., a coffee bean) or some other visual indication (e.g., text) to instruct the user to add coffee grounds at this point (see FIG. 7).

Figure 8:
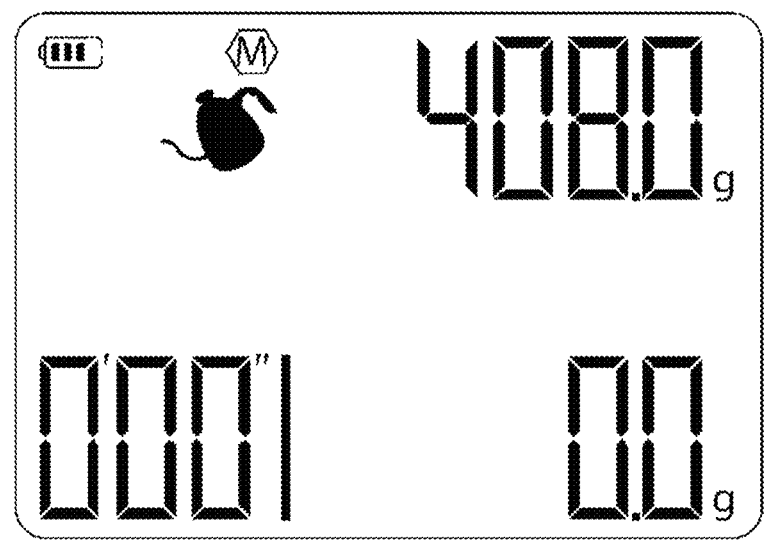
Figure 9:
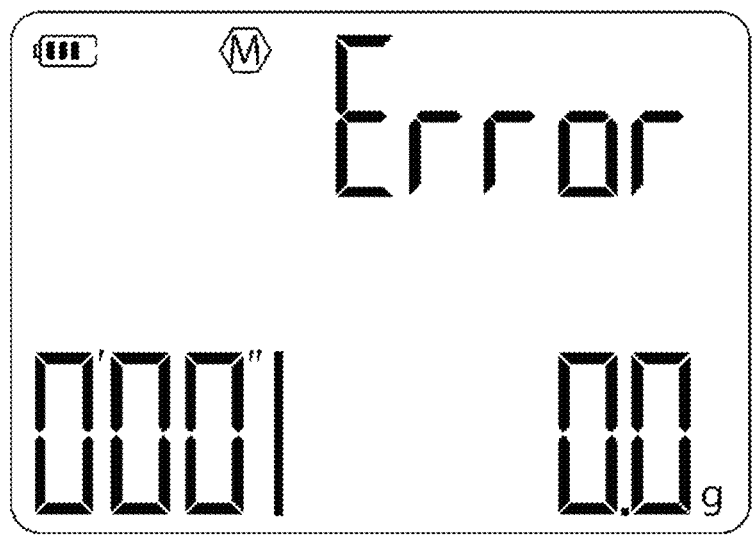

In a fourth step 304, the target amount of water to be added is calculated based on the selected water to coffee grounds ratio. For instance, the user may simply hit the ratio button and the scale will automatically calculate the target amount of water to add using the selected ratio. In the depicted embodiment, the target amount of water is 408 grams based on the previously-added 24 grams of coffee grounds, calculated at the selected 17:1 ratio (see FIG. 8). The target amount of water is displayed in the upper right corner of the display 103 in the depicted embodiment, but alternatively may be shown in other locations on the screen. Once the target amount of water to be added is calculated, the scale display 103 may show an icon (e.g., a kettle) or some other visual indication (e.g., text), and/or an audible signal or verbal communication may be produced by the scale or device, to instruct the user to begin adding water (see FIG. 8). At this point, the coffee grounds' weight in the lower right corner of the display 103 is replaced by the actual amount of water added, which has an initial value of zero. In some embodiments, if the user has improperly removed the vessel or tared the coffee beans and tries to calculate the amount of water, the display 103 may show an error message indicating to the user that some remedial action is necessary to continue the brewing process (see FIG. 9).

Figure 10:
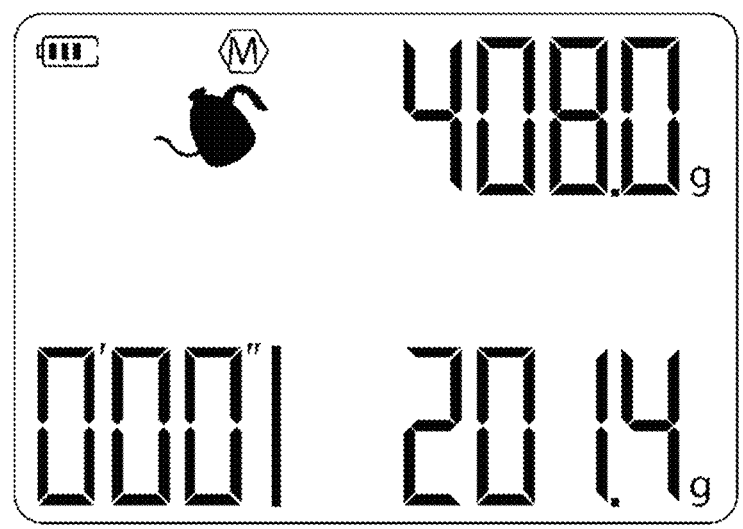
Figure 11:
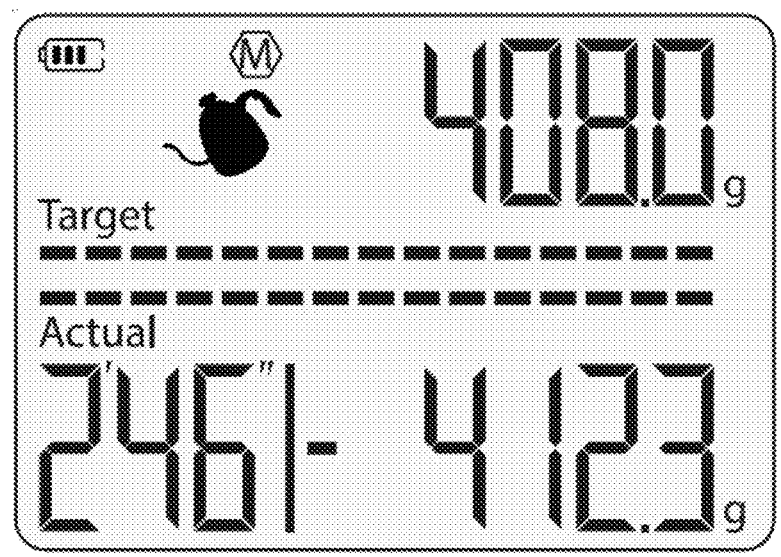

In a fifth step 305, the user adds water to the vessel on the scale platform 102. The display 103 may continuously show the actual weight of water that has been added along with the target amount of water (see FIG. 10). Once the actual weight value reaches the target weight, the scale 100 may indicate to the user to stop adding water. For instance, the display 103 is configured to change color from orange to white in the depicted embodiment (see FIG. 11), though any color combination may be used. Other indicator signals may alternatively be used of course, such as an audible beep or visual text instruction.

Figure 12:
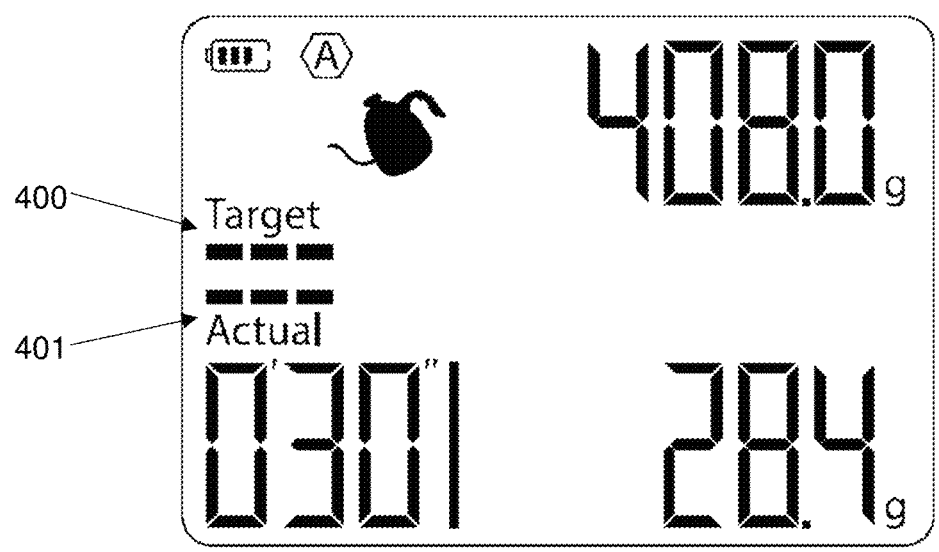
Figure 13:
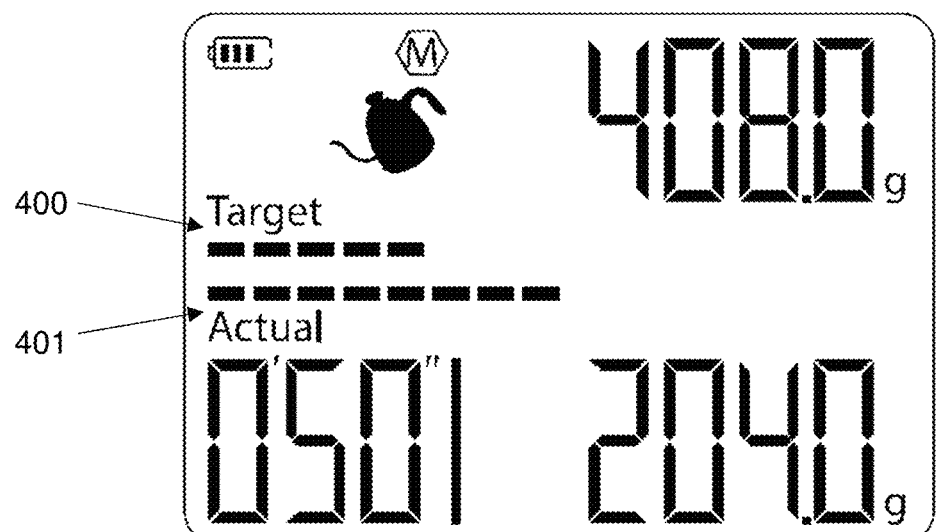
Figure 14:
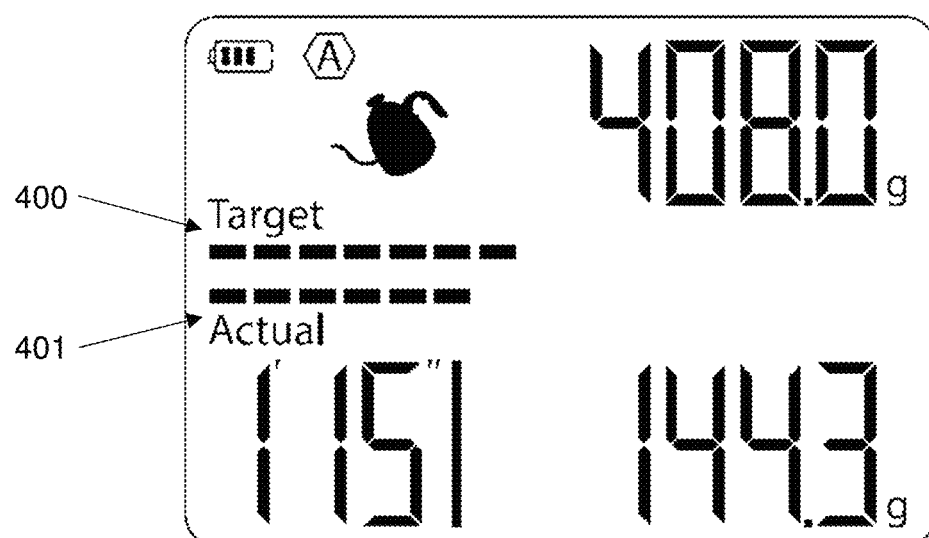

In certain embodiments, a pour rate mode may also be initiated during the fifth step 305 of adding water. The pour rate mode communicates the user's actual pour rate in relation to a target pour rate over a total target pour time. Per certain industry standards, the optimal target pour time of water over coffee grounds is about 2.5 minutes (150 seconds) with the rate of pour being constant over that time, meaning the target amount of water poured is evenly distributed over the target pour time. Therefore, in the pour rate mode, the display may be configured to show a target pour rate and an actual pour rate. The target pour rate is a visual representation of the target pour time. Put another way, the target pour time is progressively displayed using the target pour rate. For example, the target pour time is indicated by the upper line of horizontal bar segments in the depicted embodiment (see FIG. 12). Each segment represents a 10 second interval and appears consecutively from left to right as the timer counts from 0 to 150 seconds. Thus, the display of the next segment every 10 seconds is a visual representation of the target pour rate, while all 15 bar segments together represent the target pour time of 150 seconds total. The actual time is shown in the lower left corner of the display, but alternatively may be shown in other locations of the screen. In FIG. 12, for instance, 30 seconds has elapsed on the timer, with the target pour rate visually indicated by the progression of three bar segments. It should be appreciated that the target pour time may be set by default according to the selected mode (e.g., 150 seconds for coffee), selected using the last saved setting, or manually selected by the user to any desired target pour time. Likewise, it may be desirable to intentionally vary the target pour rate in certain embodiments, as described below.

As with the target pour rate, the actual pour rate is also progressively indicated on the display to allow a user to compare the rates. The actual pour rate is calculated by the scale using the measured weight of water that has been added. In the depicted embodiment of FIG. 12, for example, the actual pour rate is indicated by the lower line of horizontal bar segments, which correspond to the bar segments representing the target pour rate/time. Unlike the bar segments for the target pour rate (each represent 1/15th of the target pour time), the bar segments for the actual pour rate each represent 1/15th of the target water weight. Therefore, if the user adds water at the correct pace, the actual pour rate indicator 401 will match the progressive representation of the target pour rate indicator 400 (see FIG. 12). In the depicted embodiment, this means that the bar segments for the target and actual pour rates will advance across the display in unison. If the user pours the water too quickly (i.e. the scale measures a greater weight of water than should be expected at that point), the actual pour rate indicator 401 will outpace the target pour rate indicator 400 (see FIG. 13). If the user pours the water too slowly (i.e. the scale measures less water than should be expected at that point), the actual pour rate indicator 401 will fall behind the target pour rate indicator 400 (see FIG. 14). This real-time visual signaling of the actual pour rate relative to the target pour rate allows the user to correct how he/she is pouring the water to better approach the ideal rate.

Figure 15:
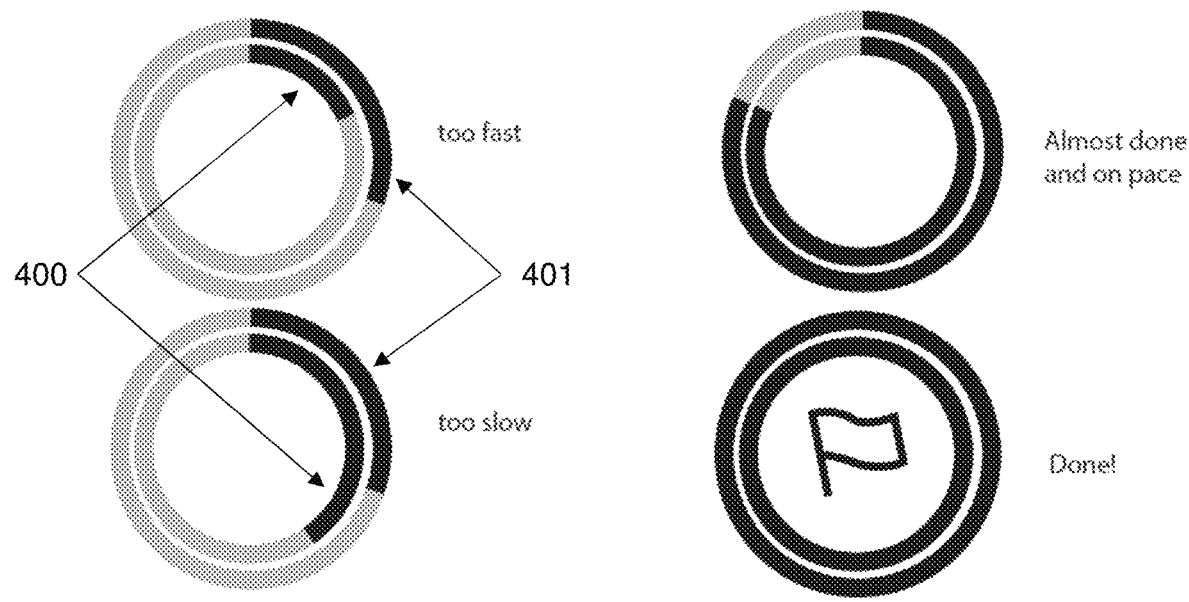
FIGS. 15 and 16 show alternative embodiments of a scale display for comparing an actual pour rate to a target pour rate.
Figure 16:
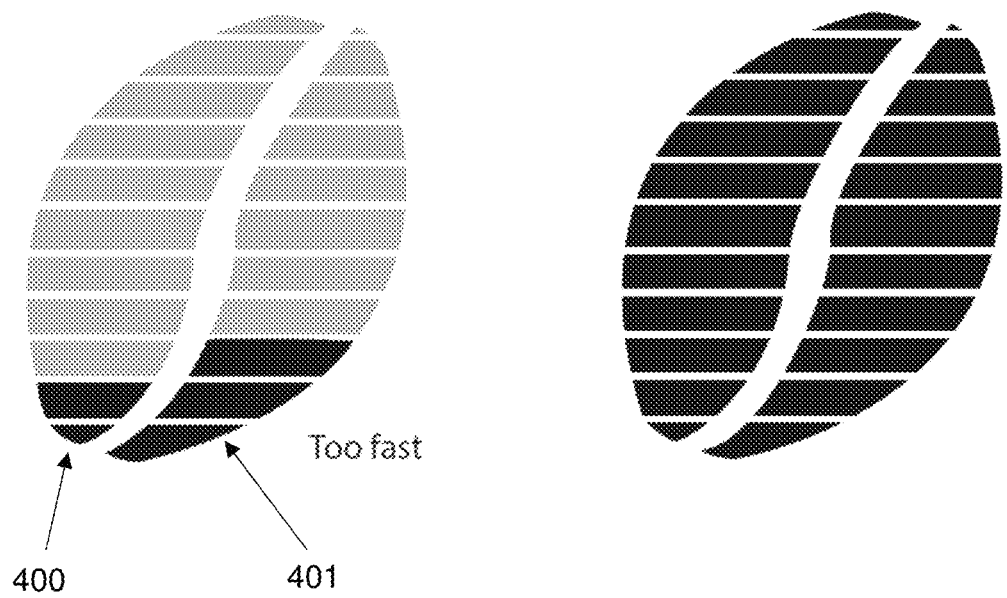

Although the target pour rate and actual pour rate are represented by left-to-right progressing horizontal bar segments in the depicted embodiment, any number of visual indicators may alternatively be used and still fall within the scope of the present disclosure. For instance, the progression need not be shown using individual bar segments and could instead be shown by a single expanding bar in real time. The bars could also be vertically oriented, rather than the depicted horizontal orientation. Further, bar indicators need not be used at all; various other representations could instead be used according to the present disclosure (e.g., a balancing scale; numeric values). As such, alternative embodiments of graphical user interface configurations for displaying and comparing the target pour rate and the actual pour rate are shown in FIGS. 15 and 16. In FIG. 15, the inner circle represents the target pour rate indicator 400 and the outer circle represents the actual pour rate indicator 401, with progressive shading of the two circles allowing a user to compare the relative rates throughout the pouring process. In FIG. 16, the left side of the bean icon represents the target pour rate indicator 400 and the right side of the bean icon represents the actual pour rate indicator 401, with progressive shading of the icon bars allowing a user to compare the relative rates throughout the pouring process.

While the preceding description discussed the actual pour rate in comparison to a target pour rate that is ideally constant over the target pour time, it may be desirable to intentionally vary the pour rate in certain embodiments. This could be due to the specific type of beverage being brewed, or as in the case of coffee, according to alternative brewing techniques. For example, the user may want to perform a pre-infusion step, wherein the coffee grounds are first soaked in an amount of water about twice their weight for approximately 20-60 seconds to release carbon dioxide, before beginning to pour the rest of the water. Likewise, the user may want to implement a cyclic pouring technique, wherein the user intermittently pours water and then pauses throughout the target pour time to create different flavor profiles during extraction. Under those circumstances, visual/audible indicators may communicate to the user when to pour water (during which time the target/actual pour rate indicators 400, 401 may progress as already described above) and when to pause pouring the water. For instance, during pauses where the user is not supposed to add water in the selected technique, the target/actual pour rate indicators 400, 401 could change from shaded to transparent; the entire display 103 could temporarily change color; an additional visual indicator to pause pouring (e.g., a "stop" icon or textual instruction) could be shown; an audible beep or other noise or instruction could be transmitted from the scale/device; or any other appropriate signal, alone or in combination, could be communicated to the user.

In automatic mode, the pour rate mode may initiate as soon as the scale 100 registers that the user has started adding water. In manual mode, the user may initiate the pour rate mode by hitting the timer button, for example. Alternatively, in manual mode, the user may decide not to initiate the pour rate mode and simply add water until the target amount is reached. Regardless of the status of the pour rate mode, the scale will indicate to the user to stop adding water once the target amount of water has been added, such as by the display changing color as discussed above (see FIG. 11). The timer and actual weight values may continue to be displayed at this point in some embodiments.

In a sixth step 306, the user removes the vessel and completes the brewing process 300. In automatic mode, the scale may automatically reset after a few seconds in preparation for the next brewing. In manual mode, a user may need to reset the timer and tare the scale for subsequent brewing by pressing the timer and zero buttons, respectively. At this point, the scale may also save the last used settings as the default settings for future uses. The scale may be further configured to automatically turn off after a set period of time without user input, for example two minutes or so.

As used herein, the depicted representations of any icons or visual indicators are for illustrative purposes only and purely decorative in nature, since various other embodiments and designs could alternatively be used for each icon and/or visual indicator, including the bean/kettle icons and the actual/target pour rate bar segments, for example. No limitations as to the depicted graphical user interface is intended or should be inferred. Likewise, although the communication of information to a user at various points in the brewing process has largely been described in terms of visual indicators signaled by the display, audible indicators transmitted by the scale and/or smart device (e.g., verbal instructions, beeps or other noises) may also be used to communicate this information to the user in addition to, or in place of, such visual indicators. Further, various combinations of features that have been described in terms of manual and automatic modes are possible and therefore not necessarily limited to any particular mode of use, if different modes are even provided for a given embodiment.

While a number of aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general, the terms and phrases used herein have their art-recognized meaning, which can be found by reference to standard texts, journal references and contexts known to those skilled in the art. The above definitions are provided to clarify their specific use in the context of the invention.

In accordance with the present disclosure, a set of claims for a digital scale configured to execute a control logic may include:

1. A digital scale for a brewing process using pour-over brewing techniques, the digital scale having a display with a plurality of visual indicators to communicate information to a user, the digital scale having a control logic comprising the steps of:
   sensing when a brewing vessel is placed on the digital scale and taring the brewing vessel;
   activating and controlling a first indicator of the display, the first indicator communicating to add coffee grounds to the brewing vessel;
   sensing when an amount of coffee grounds is added to the brewing vessel;
   calculating a target amount of water to add to the brewing vessel from a weight ratio of water to coffee grounds and the amount of coffee grounds added to the brewing vessel;
   activating and controlling a second indicator of the display, the second indicator communicating to add water to the brewing vessel;
   activating and controlling a target pour rate indicator of the display and an actual pour rate indicator of the display when the control logic detects that water has been added to the brewing vessel, the target pour rate indicator is based on a target total pour time and communicates a target pour rate for adding water, the actual pour rate indicator is based on an actual amount of water added to the brewing vessel and communicates an actual pour rate of water being added, the actual pour rate indicator being communicated relative to the target pour rate indicator thereby allowing comparison of the actual pour rate to the target pour rate;
   activating and controlling a third indicator of the display, the third indicator communicating when the target amount of water has been added to the brewing vessel.

2. The control logic of claim 1, further comprising the step of activating and controlling one or more audible indicators transmitted by the digital scale in connection with at least one indicator of the plurality of visual indicators of the display.

3. The control logic of claim 1 or 2, wherein the second indicator further communicates the target amount of water to add to the brewing vessel after the target amount of water is calculated.

4. The control logic of any of the preceding claims, wherein the third indicator comprises a change in color of the display when the target amount of water has been added to the brewing vessel.

5. The control logic of any of the preceding claims, further comprising the step of activating and controlling a fourth indicator of the display, the fourth indicator communicating the actual amount of water added to the brewing vessel when the control logic detects that water has been added to the brewing vessel, the actual amount of water added being continuously updated as more water is added.

6. The control logic of any of the preceding claims, wherein the weight ratio of water to coffee grounds is preset by a default setting of the control logic.

7. The control logic of any of claims 1 to 5, wherein the weight ratio of water to coffee grounds is determined by a saved setting of the control logic recorded in a previous use.

8. The control logic of any of claims 1 to 5, wherein the weight ratio of water to coffee grounds is automatically determined by a mode of the control logic being selected via user input.

9. The control logic of any of claims 1 to 5, wherein the weight ratio of water to coffee grounds is determined via user input before the target amount of water to add to the brewing vessel is calculated.

10. The control logic of any of the preceding claims, wherein the target total pour time is preset by a default setting of the control logic.

11. The control logic of any of claims 1 to 9, wherein the target total pour time is determined by a saved setting of the control logic recorded in a previous use.

12. The control logic of any of claims 1 to 9, wherein the target total pour time is automatically determined by a mode of the control logic being selected via user input.

13. The control logic of any of claims 1 to 9, wherein the target total pour time is determined via user input before water is added to the brewing vessel.

14. The control logic of any of the preceding claims, wherein the actual pour rate indicator and the target pour rate indicator are visual indicators progressively represented alongside one another on the display of the digital scale.

15. The control logic of any of the preceding claims, wherein the target pour rate is constant over the target total pour time.

16. The control logic of any of claims 1 to 14, wherein the target pour rate is varied over the target total pour time.

17. The control logic of claim 16, wherein the target pour rate comprises one or more periods of time when no water is to be added to the brewing vessel during the total target pour time.

18. The control logic of claim 17, wherein the target pour rate indicator and the actual pour rate indicator communicate not to add water during the one or more periods of time when no water is to be added to the brewing vessel.

19. The control logic of claim 17, further comprising the step of activating and controlling a pause pour indicator, the pause pour indicator communicating not to add water during the one or more periods of time when no water is to be added to the brewing vessel, wherein the pause pour indicator comprises a visual indicator provided on the display of the digital scale.

20. The control logic of claim 17, further comprising the step of activating and controlling a pause pour indicator, the pause pour indicator communicating not to add water during the one or more periods of time when no water is to be added to the brewing vessel, wherein the pause pour indicator comprises an audible indicator transmitted by the digital scale.

21. The control logic of any of the preceding claims, wherein the control logic is configured for a brewing process using tea leaves instead of coffee grounds, the steps of the control logic otherwise being the same.

22. The control logic of any of claims 1 to 20, wherein the control logic is configured for a brewing process using a botanical or herbal blend instead of coffee grounds, the steps of the control logic otherwise being the same.

In accordance with the present disclosure, a set of claims for a brewing process using a digital scale may include:

1. A brewing process using a digital scale for pour-over brewing techniques, the digital scale having a display and a plurality of indicators to communicate information to a user, the brewing process comprising the steps of:
    placing a brewing vessel on the digital scale and taring the brewing vessel;
    a first indicator of the plurality of indicators communicating to add coffee grounds to the brewing vessel;
    adding an amount of coffee grounds to the brewing vessel;
    the digital scale calculating a target amount of water to add to the brewing vessel from a weight ratio of water to coffee grounds and the amount of coffee grounds added to the brewing vessel;
    a second indicator of the plurality of indicators communicating to add water to the brewing vessel;
    adding water to the brewing vessel, whereby a target pour rate indicator of the plurality of indicators communicates a target pour rate for adding water, and an actual pour rate indicator of the plurality of indicators communicates an actual pour rate of water being added, the target pour rate indicator is based on a target total pour time and the actual pour rate indicator is based on an actual amount of water added to the brewing vessel, the actual pour rate indicator is communicated relative to the target pour rate indicator thereby allowing the user to compare the actual pour rate to the target pour rate;
    a third indicator of the plurality of indicators communicating when the target amount of water has been added to the brewing vessel.

2. The brewing process of claim 1, wherein the plurality of indicators of the digital scale comprise one or more visual indicators provided on the display of the digital scale.

3. The brewing process of claim 1 or 2, wherein the plurality of indicators of the digital scale comprise one or more audible indicators transmitted by the digital scale.

4. The brewing process of any of the preceding claims, wherein the second indicator further communicates the target amount of water to add to the brewing vessel after the target amount of water is calculated.

5. The brewing process of any of the preceding claims, wherein the third indicator comprises a visual indicator which changes a color of the display of the digital scale when the target amount of water has been added to the brewing vessel.

6. The brewing process of any of the preceding claims, wherein a fourth indicator of the plurality of indicators communicates the actual amount of water added to the brewing vessel during the step of adding water, the actual amount of water added continuously updated as more water is added.

7. The brewing process of any of the preceding claims, wherein the weight ratio of water to coffee grounds is preset by default.

8. The brewing process of any of claims 1 to 6, wherein the weight ratio of water to coffee grounds is determined by a saved setting from a previous brewing.

9. The brewing process of any of claims 1 to 6, further comprising the step of selecting a mode of the digital scale at a point before the digital scale calculates the target amount of water to add to the brewing vessel, wherein the weight ratio of water to coffee grounds is automatically determined by the mode.

10. The brewing process of any of claims 1 to 6, further comprising the step of selecting the weight ratio of water to coffee grounds at a point before the digital scale calculates the target amount of water to add to the brewing vessel.

11. The brewing process of any of the preceding claims, wherein the target total pour time is preset by default.

12. The brewing process of any of claims 1 to 10, wherein the target total pour time is determined by a saved setting from a previous brewing.

13. The brewing process of any of claims 1 to 10, further comprising the step of selecting a mode of the digital scale at a point before adding water to the brewing vessel, wherein the target total pour time is automatically determined by the mode.

14. The brewing process of any of claims 1 to 10, further comprising the step of selecting the target total pour time at a point before adding water to the brewing vessel.

15. The brewing process of any of the preceding claim, wherein the actual pour rate indicator and the target pour rate indicator are visual indicators progressively represented alongside one another on the display of the digital scale.

16. The brewing process of any of the preceding claim, wherein the target pour rate is constant over the target total pour time.

17. The brewing process of any of claims 1 to 15, wherein the target pour rate is varied over the target total pour time.

18. The brewing process of claim 17, wherein the target pour rate comprises one or more periods of time when no water is to be added to the brewing vessel during the total target pour time.

19. The brewing process of claim 18, wherein the target pour rate indicator and the actual pour rate indicator communicate not to add water during the one or more periods of time when no water is to be added to the brewing vessel.

20. The brewing process of claim 18, wherein a pause pour indicator communicates not to add water during the one or more periods of time when no water is to be added to the brewing vessel, the pause pour indicator comprising a visual indicator provided on the display of the digital scale.

21. The brewing process of claim 18, wherein a pause pour indicator communicates not to add water during the one or more periods of time when no water is to be added to the brewing vessel, the pause pour indicator comprising an audible indicator transmitted by the digital scale.

22. The brewing process of any of the preceding claims, wherein tea leaves are used instead of coffee grounds.

23. The brewing process of any of claims 1 to 21, wherein a botanical or herbal blend is used instead of coffee grounds.

LIST OF REFERENCE NUMERALS

- 100—Scale
- 101—Base
- 102—Platform
- 103—Display
- 104—Input Buttons
- 200—Brewing Vessel
- 201—Filter Basket Portion
- 202—Vessel Body
- 300—Brewing Process
- 301—Turn On Scale/Adjust Settings
- 302—Place Vessel on Scale/Tare Scale
- 303—Add Coffee Grounds
- 304—Calculate Target Amount of Water
- 305—Add Water to Target Amount/Pour Rate Comparison
- 306—Remove Vessel/Complete Brewing
- 400—Target Pour Rate Indicator
- 401—Actual Pour Rate Indicator

The invention claimed is:

1. A non-transitory computer-readable medium for a digital scale for a brewing process using pour-over brewing techniques, the digital scale having a display with a plurality of visual indicators to communicate information to a user, the non-transitory computer-readable medium comprising instructions that, when executed by a processor of the digital scale, cause the digital scale to implement a method comprising:

sensing when a brewing vessel is placed on the digital scale and taring the brewing vessel;

activating and controlling a first indicator of the display, the first indicator communicating to add coffee grounds to the brewing vessel;

sensing when an amount of coffee grounds is added to the brewing vessel;

calculating a target amount of water to add to the brewing vessel from a weight ratio of water to coffee grounds and the amount of coffee grounds added to the brewing vessel;

activating and controlling a second indicator of the display, the second indicator communicating to add water to the brewing vessel;

activating and controlling a target pour rate indicator of the display and an actual pour rate indicator of the display when the digital scale detects that water has been added to the brewing vessel, the target pour rate indicator is based on a target total pour time and communicates a target pour rate for adding water, the actual pour rate indicator is based on an actual amount of water added to the brewing vessel and communicates an actual pour rate of water being added, the actual pour rate indicator being communicated relative to the target pour rate indicator thereby allowing comparison of the actual pour rate to the target pour rate;

activating and controlling a third indicator of the display, the third indicator communicating when the target amount of water has been added to the brewing vessel.

2. The non-transitory computer-readable medium of claim 1, wherein the method implemented further comprises activating and controlling one or more audible indicators transmitted by the digital scale in connection with at least one indicator of the plurality of visual indicators of the display.

3. The non-transitory computer-readable medium of claim 1, wherein the second indicator further communicates the target amount of water to add to the brewing vessel after the target amount of water is calculated.

4. The non-transitory computer-readable medium of claim 1, wherein the third indicator comprises a change in color of the display when the target amount of water has been added to the brewing vessel.

5. The non-transitory computer-readable medium of claim 1, wherein the method implemented further comprises activating and controlling a fourth indicator of the display, the fourth indicator communicating the actual amount of water added to the brewing vessel when the digital scale detects that water has been added to the brewing vessel, the actual amount of water added being continuously updated as more water is added.

6. The non-transitory computer-readable medium of claim 1, wherein the weight ratio of water to coffee grounds is preset by a default setting or determined by a saved setting recorded in a previous use.

7. The non-transitory computer-readable medium of claim 1, wherein the weight ratio of water to coffee grounds is automatically determined by a mode being selected via user input.

8. The non-transitory computer-readable medium of claim 1, wherein the weight ratio of water to coffee grounds is determined via user input before the target amount of water to add to the brewing vessel is calculated.

9. The non-transitory computer-readable medium of claim 1, wherein the target total pour time is preset by a default setting or determined by a saved setting recorded in a previous use.

10. The non-transitory computer-readable medium of claim 1, wherein the target total pour time is automatically determined by a mode being selected via user input.

11. The non-transitory computer-readable medium of claim 1, wherein the target total pour time is determined via user input before water is added to the brewing vessel.

12. The non-transitory computer-readable medium of claim 1, wherein the actual pour rate indicator and the target pour rate indicator are visual indicators progressively represented alongside one another on the display of the digital scale.

13. The non-transitory computer-readable medium of claim 1, wherein the target pour rate is constant over the target total pour time.

14. The non-transitory computer-readable medium of claim 1, wherein the target pour rate is varied over the target total pour time.

15. The non-transitory computer-readable medium of claim 14, wherein the target pour rate comprises one or more periods of time when no water is to be added to the brewing vessel during the total target pour time.

16. The non-transitory computer-readable medium of claim 15, wherein the target pour rate indicator and the actual pour rate indicator communicate not to add water during the one or more periods of time when no water is to be added to the brewing vessel.

17. The non-transitory computer-readable medium of claim 15, wherein the method implemented further comprises activating and controlling a pause pour indicator, the pause pour indicator communicating not to add water during the one or more periods of time when no water is to be added to the brewing vessel, wherein the pause pour indicator comprises a visual indicator provided on the display of the digital scale.

18. The non-transitory computer-readable medium of claim 15, wherein the method implemented further comprises activating and controlling a pause pour indicator, the pause pour indicator communicating not to add water during the one or more periods of time when no water is to be added to the brewing vessel, wherein the pause pour indicator comprises an audible indicator transmitted by the digital scale.

19. The non-transitory computer-readable medium of claim 1, wherein the instructions of the non-transitory computer-readable medium are configured for a brewing process using tea leaves instead of coffee grounds, the steps of the method implemented otherwise being the same.

20. The non-transitory computer-readable medium of claim 1, wherein the instructions of the non-transitory computer-readable medium are configured for a brewing process using a botanical or herbal blend instead of coffee grounds, the steps of the method implemented otherwise being the same.

* * * * *